US010592235B2

(12) United States Patent
Gopal et al.

(10) Patent No.: US 10,592,235 B2
(45) Date of Patent: *Mar. 17, 2020

(54) GENERATING AN IDEMPOTENT WORKFLOW

(71) Applicant: Microsoft Technology Licensing, LLC, Redmond, WA (US)

(72) Inventors: Burra Gopal, Bellevue, WA (US); Yuriy Labunets, Redmond, WA (US); Amy R. Simpson, Kirkland, WA (US); James Rupke, Seattle, WA (US); Kai Zhu, Bellevue, WA (US); Roberto Taboada, Duvall, WA (US); Shayan Kayhanian, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/332,426

(22) Filed: Oct. 24, 2016

(65) Prior Publication Data

US 2017/0039063 A1    Feb. 9, 2017

Related U.S. Application Data

(63) Continuation of application No. 14/015,160, filed on Aug. 30, 2013, now Pat. No. 9,509,550.

(51) Int. Cl.
*G06F 9/44* (2018.01)
*G06F 8/72* (2018.01)
(Continued)

(52) U.S. Cl.
CPC .......... *G06F 8/72* (2013.01); *H04L 41/0226* (2013.01); *G06F 8/40* (2013.01); *G06F 8/41* (2013.01); *G06F 8/443* (2013.01)

(58) Field of Classification Search
CPC ..... G06F 8/40; G06F 8/41; G06F 8/72; G06F 8/443
See application file for complete search history.

(56) References Cited

U.S. PATENT DOCUMENTS 5,937,388 A    8/1999  Davis
6,052,684 A    4/2000  Du
(Continued)

OTHER PUBLICATIONS

Peter Moller Neergaard and Harry G. Mairson; Types, Potency, and Idempotency: Why Nonlinearity and Amnesia Make a Type System Work; ACM; Sep. 2004; retrieved online on Oct. 28, 2019, pp. 138-149. Retrieved from the Internet: <URL: http://delivery.acm.org/10.1145/1020000/1016871/p138-mollerneergaard.pdf?>. (Year: 2004).*

(Continued)

*Primary Examiner* — Hanh Thi-Minh Bui
(74) *Attorney, Agent, or Firm* — Michael Best & Friedrich LLP (57) ABSTRACT

Various methods and systems for generating an idempotent workflow are described herein. In one example, a method includes detecting distributed code and identifying a boundary function in the distributed code. The method can also include separating the boundary function into a transition function, a non-idempotent function, and a reversion function. Additionally, the method can include transforming the non-idempotent function into an idempotent function by generating a flag corresponding to the non-idempotent function, wherein the flag indicates if the non-idempotent function has been executed. Furthermore, the method can include combining the transition function, the idempotent function, and the reversion function to form the idempotent workflow.

17 Claims, 6 Drawing Sheets

(51) Int. Cl.
*H04L 12/24* (2006.01)
*G06F 8/41* (2018.01)
*G06F 8/40* (2018.01)

(56) References Cited

U.S. PATENT DOCUMENTS

| | | | |
|---|---|---|---|
| 6,393,456 B1 | 8/2002 | Ambler | |
| 6,792,597 B1* | 9/2004 | Halpern | G06F 9/5016 |
| | | | 714/E11.209 |
| 6,996,802 B2* | 2/2006 | de Jong | G06F 9/4486 |
| | | | 717/107 |
| 8,418,160 B2 | 4/2013 | Doyle | |
| 8,752,021 B2 | 6/2014 | Li | |
| 2007/0078816 A1 | 4/2007 | Stern | |
| 2012/0254291 A1 | 10/2012 | Feldman | |
| 2013/0067133 A1 | 3/2013 | Mansell | |
| 2013/0074055 A1 | 3/2013 | Gounares | |
| 2013/0074057 A1 | 3/2013 | Gounares | |
| 2013/0074058 A1 | 3/2013 | Gournares | |
| 2014/0040415 A1* | 2/2014 | Mathew | H04L 67/2842 |
| | | | 709/213 |
| 2014/0372996 A1 | 12/2014 | Ardoint | |

OTHER PUBLICATIONS

"Final Office Action Issued in U.S. Appl. No. 14/015,160", dated Feb. 24, 2016, 16 Pages.
"Non-Final Office Action Issued in U.S. Appl. No. 14/015,160", dated Aug. 27, 2015, 16 Pages.
"Notice of Allowance Issued in U.S. Appl. No. 14/015,160", dated Aug. 5, 2016, 15 Pages.
"Office Action Issued in European Patent Application No. 14766288.6", dated Dec. 12, 2016, 4 Pages.
G. Rarnalingam and Kapil Vaswani; Fault Tolerence via Idempotent Processing, ACM Jan. 2013; retrieved online on Jul. 24, 2016; pp. 1-4; retrieved fro the internet: URL: https://www.microsoft.com/en-us/research/wp-content/uploads/2016/popl38-ramalingam.pdf.
Marc de Krujif et al.; Static Analysis and Compiler Design for Idempotent Processing, ACM Jun. 2012; retrieved online on Jul. 24, 2016; pp. 475-486; retrieved from the Internet: URL: http://delivery.ac.org/10.1145/226000022541120/p75-dekrujf.pdf.
Benveniste et al., "Compositionality in Dataflow Sychronous Languages: Specification & Distributed Code Generation", Published on: Jul. 18, 2011, pp. 1-62, Available at: http://www.irisa.fr/distribcom/benveniste/pub/compos-ic-final.pdf.
Chappell, David, "Introducing Microsoft Windows Workflow Foundation: An Early Look", Published on: Aug. 2005 pp. 1-28, Available at: http://msdn.microsoft.com/en-us/library/aa480215.aspx.
Microsoft, "Designing Workflow Components", Published on: Oct. 19, 2009, pp. 1-9, Available at: http://msdn.microsoft.com/en-us/library/ee658122.aspx.
Microsoft, "Environment Variables", Published on: Oct. 10, 2011, p. 1, Available at: http://msdn.microsoft.com/en-us/library/windows/desktop/ms682653(v=vs.85).aspx.
Microsoft, "ScriptBlock Class", Retrieved on: Jul. 15, 2013, pp. 1-2, Available at: http://msdn.microsoft.com/en-us/library/windows/desktop/system.management.automation.scriptblock(v=vs.85).aspx.
Wikipedia, "Globally Unique Identifier", Retrieved on: Jul. 15, 2013, pp. 1-7, Available at: http://en.wikipedia.org/wiki/GUID.
"International Search Report and Written Opinion issued for PCT Application No. PCT/US2014/053030", dated Nov. 20, 2014, 8 Pages.
Ramalingam, et al., "Fault Tolerance via Idempotence", Proceedings of the 40th annual ACM SIGPLAN-SIGACT symposium on Principles of programming languages, vol. 48, No. 1, Jan. 23, 2013, pp. 249-262.
"First Office Action and Search Report Issued in Chinese Patent Application No. 201480048016.8", dated Apr. 2, 2018, 13 Pages.
"Second Office Action Issued in Chinese Patent Application No. 201480048016.8", dated Nov. 9, 2018, 9 Pages.
"Office Action Issued in European Patent Application No. 14766288.6", dated Mar. 4, 2019, 3 Pages.
"Office Action Issued in Chinese Patent Application No. 201480048016.8", dated Mar. 19, 2019, 8 Pages.

* cited by examiner

GENERATING AN IDEMPOTENT WORKFLOW

RELATED APPLICATIONS

This application is a continuation of and claims priority to U.S. patent application Ser. No. 14/015,160, filed Aug. 30, 2013, all of which is incorporated by referenced herein in its entirety.

BACKGROUND

Many software applications can execute operations across multiple computing devices. For example, some software applications can execute operations on local computing devices and remote computing devices. In some examples, the operations may return different values depending on the state of the computing device. Therefore, if the operations are executed multiple times or executed following an error, the operations may provide different return values.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for generating an idempotent workflow. The method can include detecting distributed code and identifying a boundary function in the distributed code. The method can also include separating the boundary function into a transition function, a non-idempotent function, and a reversion function. In addition, the method can include transforming the non-idempotent function into an idempotent function by generating a flag corresponding to the non-idempotent function, wherein the flag indicates if the non-idempotent function has been executed. Furthermore, the method can include combining the transition function, the idempotent function, and the reversion function to form the idempotent workflow.

Another embodiment provides one or more computer-readable storage media for generating an idempotent workflow comprising a plurality of instructions that, when executed by a processor, cause the processor to detect distributed code. The plurality of instructions can also cause the processor to identify a boundary function in the distributed code and separate the boundary function into additional functions. In addition, the plurality of instructions can cause the processor to transform a non-idempotent function into an idempotent function and combine the idempotent function with the additional functions to form the idempotent workflow.

Another embodiment provides a system for generating an idempotent workflow. The system comprises a processor to execute processor executable code and a storage device that stores processor executable code, wherein the processor executable code, when executed by the processor, causes the processor to detect distributed code. The processor executable code also causes the processor to identify a boundary function in the distributed code and separate the boundary function into a transition function, a non-idempotent function, and a reversion function. In addition, the processor executable code causes the processor to transform the non-idempotent function into an idempotent function. Furthermore, the processor executable code causes the processor to combine the transition function, the idempotent function, and the reversion function to form the idempotent workflow.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Many computing devices can execute applications based on distributed code. Distributed code, as referred to herein, can include any suitable number of functions in any suitable programming language, wherein the functions can be executed across processes, computing devices, and roles, among others. For example, distributed code may perform operations on a local computing device and a remote computing device. In some examples, the distributed code may return different output values depending on the state of a computing device during execution. Therefore, the output of the distributed code may be unreliable if there is an error that forces the distributed code to be restarted or executed multiple times.

Various methods for generating an idempotent workflow are described herein. An idempotent workflow, as referred to herein, can include any suitable number of segments or functions of source code, wherein each segment of source code can be executed any suitable number of times without generating different return or output values. In some embodiments, generating the idempotent workflow can include modifying distributed code so that the distributed code includes idempotent functions. Therefore, the idempotent workflow can be executed multiple times without returning different output values. Additionally, the idempotent workflow may also be restarted in case of an error without returning different output values. In some embodiments, the idempotent workflow can be generated from distributed code by modifying boundary functions and transforming non-idempotent functions within the distributed code into idempotent functions. In some examples, an idempotent function can be restarted or resumed after encountering an error and can generate an output value during a first execution of the function. A boundary function, as referred to herein, can include any suitable source code in any suitable programming language that can perform an operation for a local process, or device, among others, in a remote process, or device, among others. In some examples, the idempotent workflow can restart from any suitable boundary function or idempotent function and return consistent output values.

Figure 1:
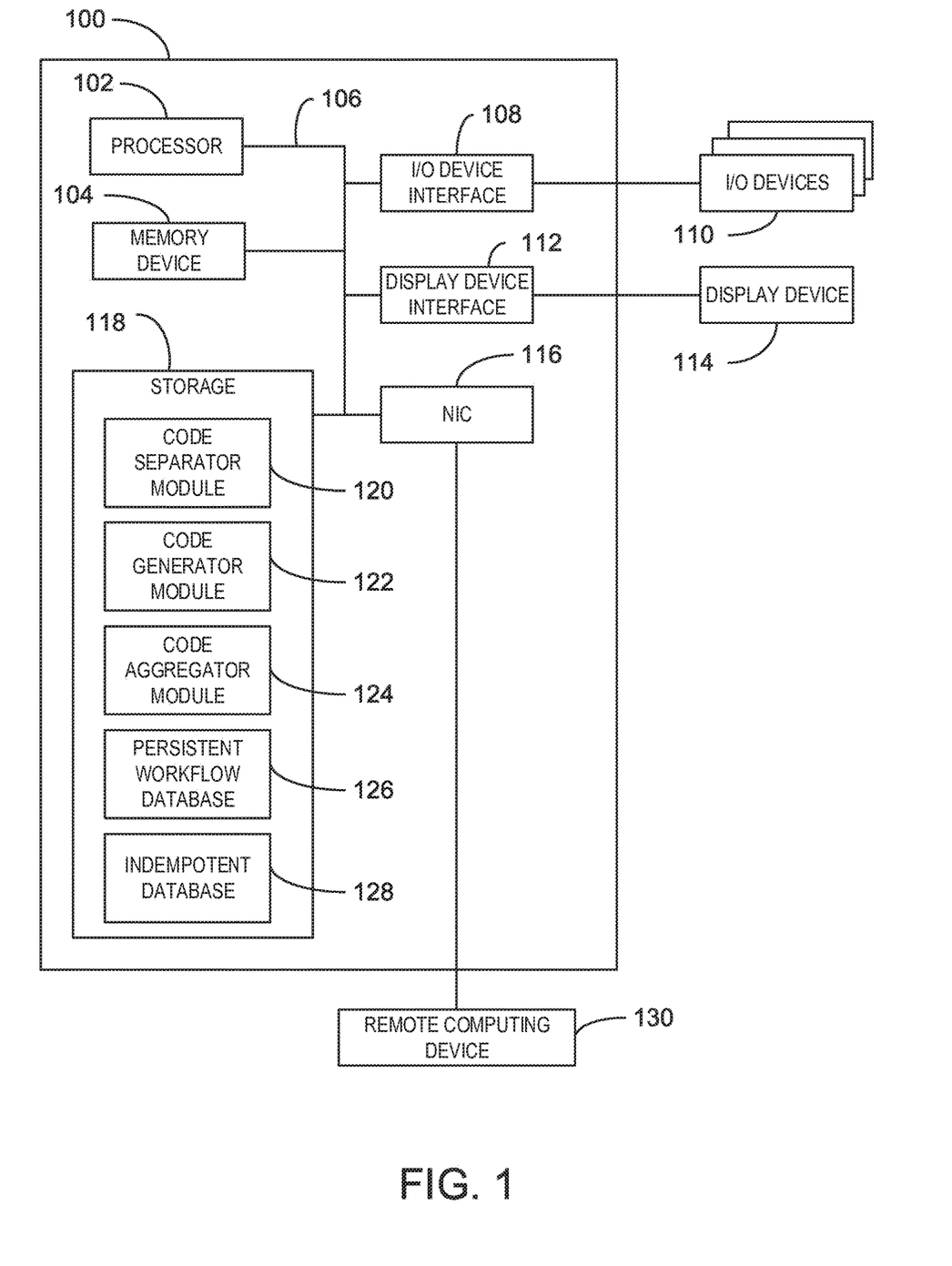
FIG. 1 is a block diagram of an example of a computing system that can generate an idempotent workflow.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can generate an idempotent workflow. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to generate an idempotent workflow.

The processor 102 may be connected through a system bus 106 (e.g., PCI, ISA, PCI-Express, HyperTransport®, NuBus, etc.) to an input/output (I/O) device interface 1108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted).

The storage 118 can include a hard drive, an optical drive, a USB flash drive, an array of drives, or any combinations thereof. The storage 118 may include a code separator module 120, a code generator creator module 122, and a code aggregator module 124. In some embodiments, the code separator module 120 can separate distributed code into various code segments (also referred to herein as functions). For example, the code separator module 120 may identify a boundary function in the distributed code and separate the boundary function into smaller functions. A boundary function can include source code that executes in a remote process, role, or computing device, among others and returns data to a local process, role, or computing device, among others. A local process, role, or computing device can include any initialization point for an idempotent workflow and can be the location for managing the idempotent workflow. For example, a boundary function may include source code that connects to a separate computing device, disconnects from a computing device, or executes source code on a computing device and returns a value to another computing device. A boundary function may also include source code that crosses a role boundary within or across computing devices (e.g., Web Front-End role, or Application-Tier role or Database backend role, etc.) or crosses a security boundary such as source code that changes the identity of a process/thread, acquires or releases authorizations belonging to an executing process/thread, or changes how a computing device enforces security. Additionally, a boundary function may include source code that crosses a transaction/lock boundary such as source code that either starts, ends, or aborts a transaction, or executes multiple sequential transactions, or combines data from multiple transactions.

In some embodiments, the code separator module 120 may separate the boundary function into a transition function, a non-idempotent function, and a reversion function. In some embodiments, the transition function may cross a boundary such as transitioning from a local computing device to a remote computing device or transitioning from a first role to a second role, among others. In some embodiments, the non-idempotent function can include any suitable number of lines of source code in the boundary code segment that cannot be restarted and/or repeated. For example, the non-idempotent function may modify parameter values in a remote computing device. In some embodiments, the reversion function can include reversing the boundary crossed in the corresponding transition function. For example, a reversion function may transition from a remote computing device to a local computing device. In some embodiments, the code separator 120 can store the source code for functions in a persistent workflow database 126. The code separator 120 may also store a global identifier in the persistent workflow database 126 that corresponds to each function.

In some embodiments, the code generator module 122 can transform the non-idempotent function into an idempotent function. The idempotent function may be (i) restarted even if the source code produces an error during execution, (ii) executed multiple times without side-effects such as modified parameter values, (iii), executed on a computing device, or within a role, security or transaction boundary, (iv) executed in a sequential and synchronous manner, (v) executed using input parameters without depending on any other system state or side effects of previously executed source code, and (vi) expected to return a value corresponding to success or failure which can indicate if the source code is to be executed again. In some embodiments, the code generator module 122 can transform a non-idempotent function into an idempotent function by storing a flag that indicates whether the non-idempotent function has been executed. If the non-idempotent function has been executed, the non-idempotent function can return the output value generated during the previous execution. In some embodiments, the previous output values for non-idempotent functions can be stored in an idempotent database 128.

In some embodiments, the code aggregator module 124 can generate an idempotent workflow by combining the idempotent function with the transition function and the reversion function. For example, the code aggregator module 124 may generate an idempotent workflow that can authorize access to a remote computing device 130 and execute instructions on the remote computing device before the output from the remote computing device 130 is returned to a local computing device 100. In some embodiments, the code aggregator module 124 can also generate an initialization function that can indicate the first line of source code to be executed within the idempotent workflow. In some examples, the code aggregator 124 may also add an output function that can return the union of the output values in previously executed functions.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the code separator module 1120, the code generator module 122, or the code aggregator module 124 may be partially, or entirely, implemented in hardware and/or in the processor 102. For example, the functionality may be implemented with an application specific integrated circuit, in logic implemented in the processor 102, or in any other device.

Figure 2:
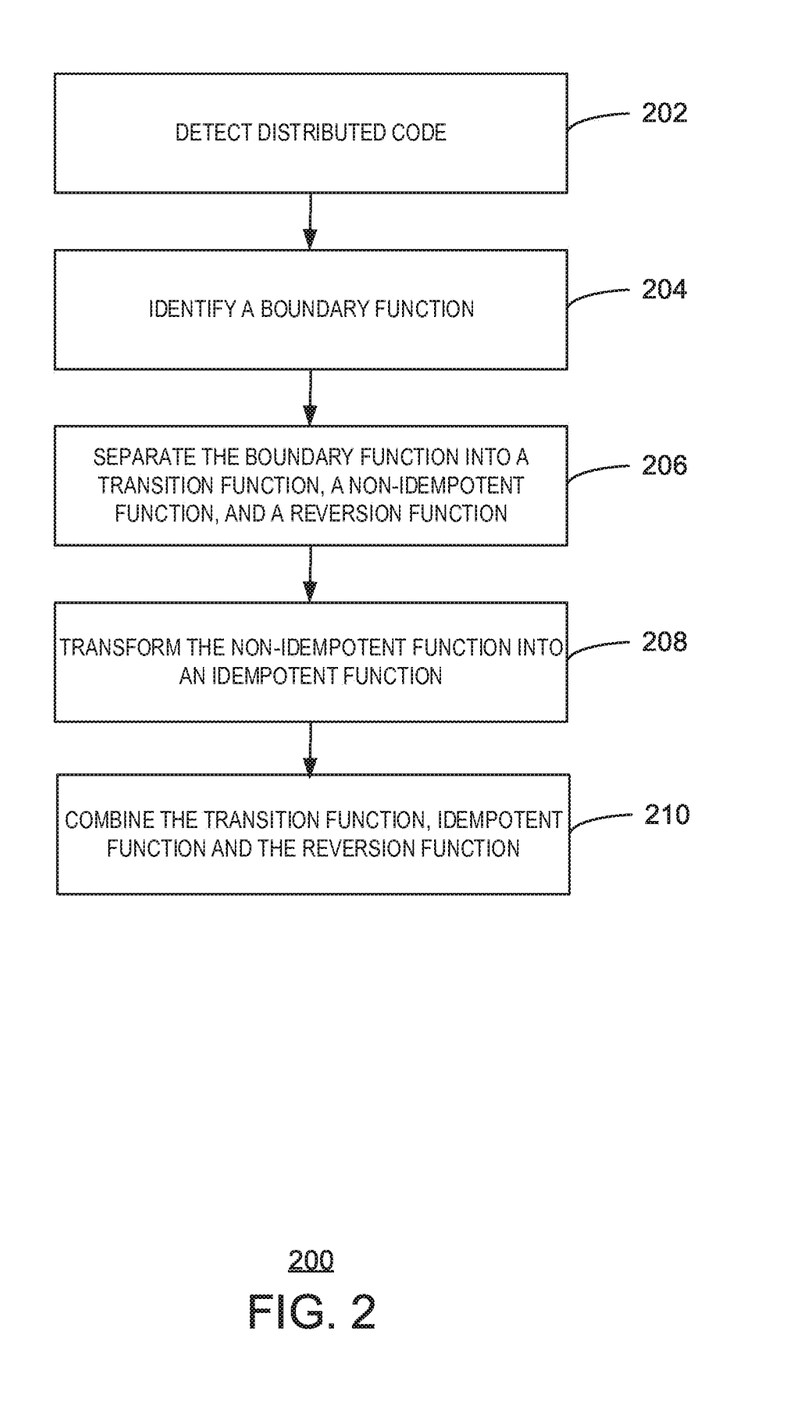
FIG. 2 is a process flow diagram of an example method for generating an idempotent workflow.

FIG. 2 is a process flow diagram of an example method for generating an idempotent workflow. The method 200 can be implemented with any suitable computing device, such as the computing device 100 of FIG. 1.

At block 202, the code separator module 120 can detect distributed code. Distributed code can include any suitable source code that can be executed in a sequential and synchronous manner within any suitable number of computing devices. In some embodiments, distributed code can include various functions that may be executed on any suitable number of computing devices. For example, distributed code may execute a first function on a first computing device and a second function on a second computing device. The distributed code may also include additional functions that are executed on the first computing device using output values from the second function executed on the second computing device.

At block 204, the code separator module 120 can identify a boundary function in the distributed code. As discussed above, a boundary function can include any portion of distributed code that may include executing instructions in two separate computing devices, processes, or roles, among others. For example, a boundary function may include executing instructions within a local computing device and a remote computing device, a first role and a second role, a first transaction and a second transaction, or within an unauthorized state and an authorized state. In some embodiments, a boundary function can include any suitable portion of source code in which a result is calculated in a remote device or process, among others, and the result is returned to a local device or process, among others.

At block 206, the code separator module 120 can separate the boundary function into a transition function, a non-idempotent function, and a reversion function. A non-idempotent function can modify values of parameters or an environment, among others. For example, the non-idempotent function may return any suitable number of output values from source code executed in a remote device, or a remote process, among others. A transition function, as referred to herein, can include any suitable source code that may transition from a local computing device, or process, among others, to a remote computing device, or process, among others. For example, a transition function may include source code that authenticates a user and transfers the execution of source code to an authenticated remote computing device. In some embodiments, reversion functions can terminate a session and return to a local session. For example, a reversion function may include any suitable source code that can terminate a session. In some examples, a reversion function can terminate an authenticated session with a remote computing device and return the flow of execution to a local computing device.

At block 208, the code generator module 122 can transform the non-idempotent function into an idempotent function by generating a flag corresponding to the non-idempotent function. In some embodiments, the flag indicates if the non-idempotent function has been previously executed. The flag can also indicate that a non-idempotent function is not to be executed again. In some examples, rather than executing the non-idempotent function, the output value of a previous execution of the non-idempotent function can be returned. For example, a non-idempotent function may be executed a first time and subsequent calls to the non-idempotent function may return the output value from the first execution of the non-idempotent function. In some embodiments, a computing device may include additional storage for the value returned by the function from the first execution of the function, so that repeated executions return identical results.

At block 210, the code aggregator 124 can combine the transition function, the idempotent function, and the reversion function to form the idempotent workflow. In some embodiments, the code aggregator 124 can generate the idempotent workflow by combining any suitable number of transition functions, idempotent functions, and reversion functions. For example, the code aggregator 124 may combine a transition function with multiple idempotent functions and a reversion function. In some examples, the code aggregator 124 can generate an idempotent workflow that can include a transition function that results in a remote computing device executing idempotent functions before returning output values to a local computing device. The code aggregator 124 may also generate idempotent workflows that can return to a local computing device after terminating a connection with a remote computing device with a reversion function.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. For example, the code generator 122 may also generate an initialization function and an output function. In some embodiments, the code aggregator 124 can combine the initialization function and the output function with transition function, the idempotent function, and the reversion function to form an idempotent workflow. Initialization functions and output functions are described in greater detail below in relation to FIG. 3.

Figure 3:
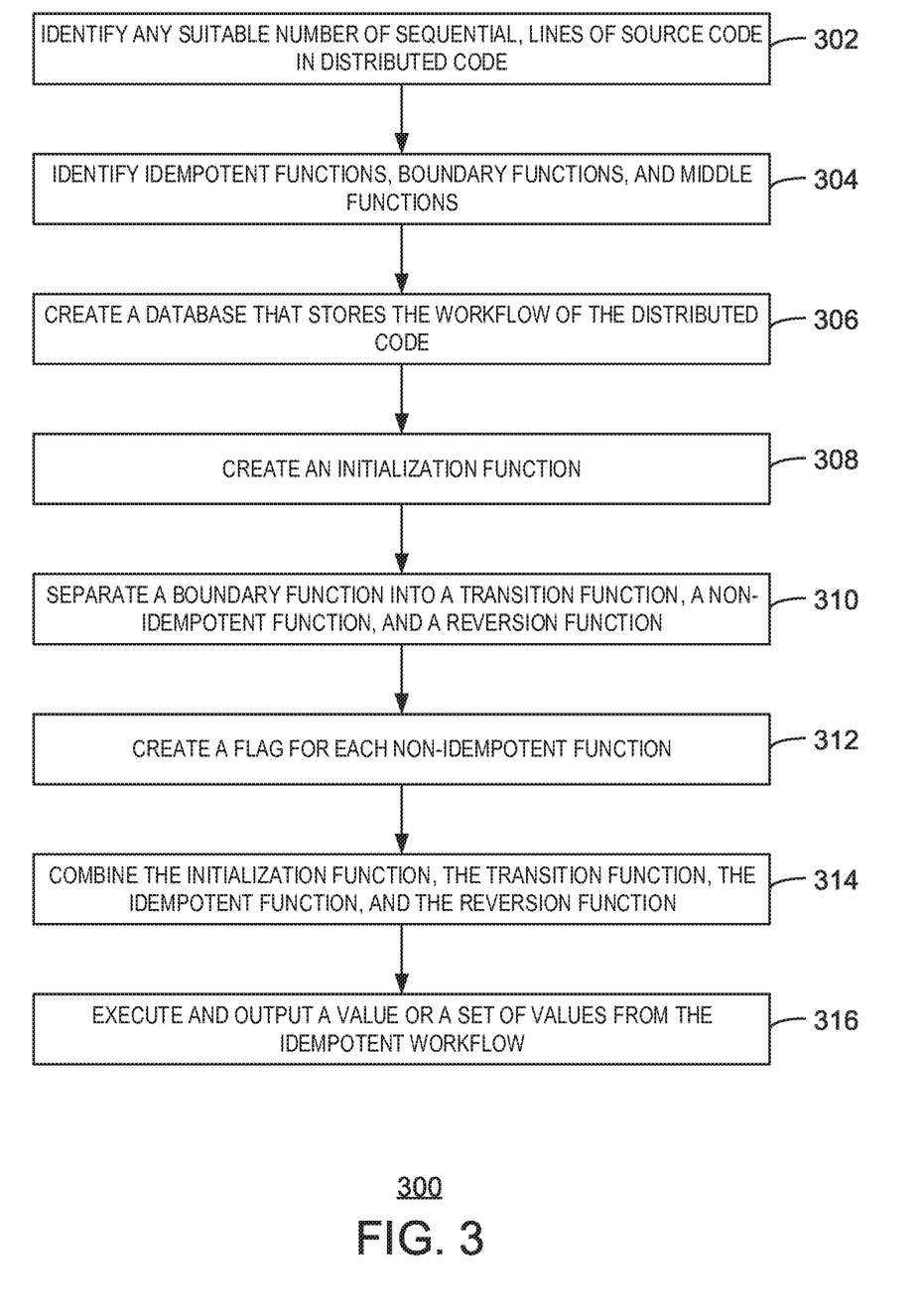
FIG. 3 is a process flow diagram of an example method for generating an idempotent workflow.

FIG. 3 is a process flow diagram of an example method for generating an idempotent workflow. The method 300 can be implemented in any suitable computing device, such as the computing device 100 of FIG. 1.

At block 302, the code separator 120 can identify any suitable number of sequential lines of source code in distributed code. In some embodiments, the sequential lines of source code can include any suitable instructions in any suitable programming language that can be executed sequentially. In some examples, the sequential lines of source code can be executed in any suitable number of computing devices, applications, or roles, among others. For example, a line of sequential source code to be executed on a local computing device could be followed by a line of sequential source code to be executed on a remote computing device.

At block 304, the code separator 120 can identify idempotent functions, boundary functions, and middle functions (also referred to herein as non-idempotent functions). As discussed above, the transition function may cross a boundary such as transitioning from a local computing device to a remote computing device or transitioning from a first role to a second role, among others. In some embodiments, the non-idempotent function can include any suitable number of lines of source code in the boundary function that cannot be restarted and/or repeated. In some embodiments, the reversion function can include reversing the boundary crossed in the corresponding transition function. For example, a reversion function may transition from a remote computing device to a local computing device.

At block 306, the code separator 120 can create a database that stores the workflow of the distributed code. The database that stores the workflow (also referred to herein as a persistent workflow database) can store the input and output values for each function along with the source code for the function. In some embodiments, the persistent workflow database can also include the input and output values for each of the previously executed function. For example, each input or output value may include a union of the previous input and output values from previously executed functions. In some embodiments, the input values can be stored in an input array, which can use any suitable data structure to store the output of each previously executed function. In some examples, each value or set of values in the input array can correspond to a function in the idempotent workflow. The persistent workflow database may also store any errors returned as output from the execution of a function. Additionally, the persistent workflow database may also store a number of instructions value representing the number of instructions in a transition function, a non-idempotent function, or a reversion function.

At block 308, the code generator module 122 can create an initialization function. In some embodiments, the initialization function can include any suitable input values and any suitable amount of source code to be executed. For example, the initialization function may establish the state or environment of a computing device in which additional functions are to be executed.

At block 310, the code separator 120 can separate a boundary function into a transition function, a non-idempotent function, and a reversion function. As discussed above, a non-idempotent function can modify values of parameters or an environment, among others. For example, the non-idempotent function may return any suitable number of output values from source code executed in a remote device, or a remote process, among others. A transition function, as referred to herein, can include any suitable source code that may transition from a local computing device, or process, among others, to a remote computing device, or process, among others. In some embodiments, reversion functions can terminate a session and return to a local session. For example, a reversion function may include any suitable source code that can terminate a session.

At block 312, the code generator 122 can create a flag for each non-idempotent function. In some embodiments, the flags can indicate whether a non-idempotent has been executed. If the non-idempotent function has been executed, a flag can indicate that an output value from a previous execution of the non-idempotent function is to be returned. In some embodiments, the flags can be stored in a separate idempotent database.

At block 314, the code aggregator module 124 can combine the initialization function, the transition function, the idempotent function, and the reversion function. The combination of the functions can result in an idempotent workflow in which each function can be restarted after an error. In some embodiments, each function in the idempotent workflow can be restarted without returning a different output value. At block 316, the code aggregator module 124 can execute the idempotent workflow and output a value or a set of values from the idempotent workflow. In some embodiments, the output values returned from an idempotent workflow may include the output values from each function executed within the idempotent workflow.

The process flow diagram of FIG. 3 is not intended to indicate that the steps of the method 300 are to be executed in any particular order, or that all of the steps of the method 300 are to be included in every case. Further, any number of additional steps may be included within the method 300, depending on the specific application.

Figure 4:
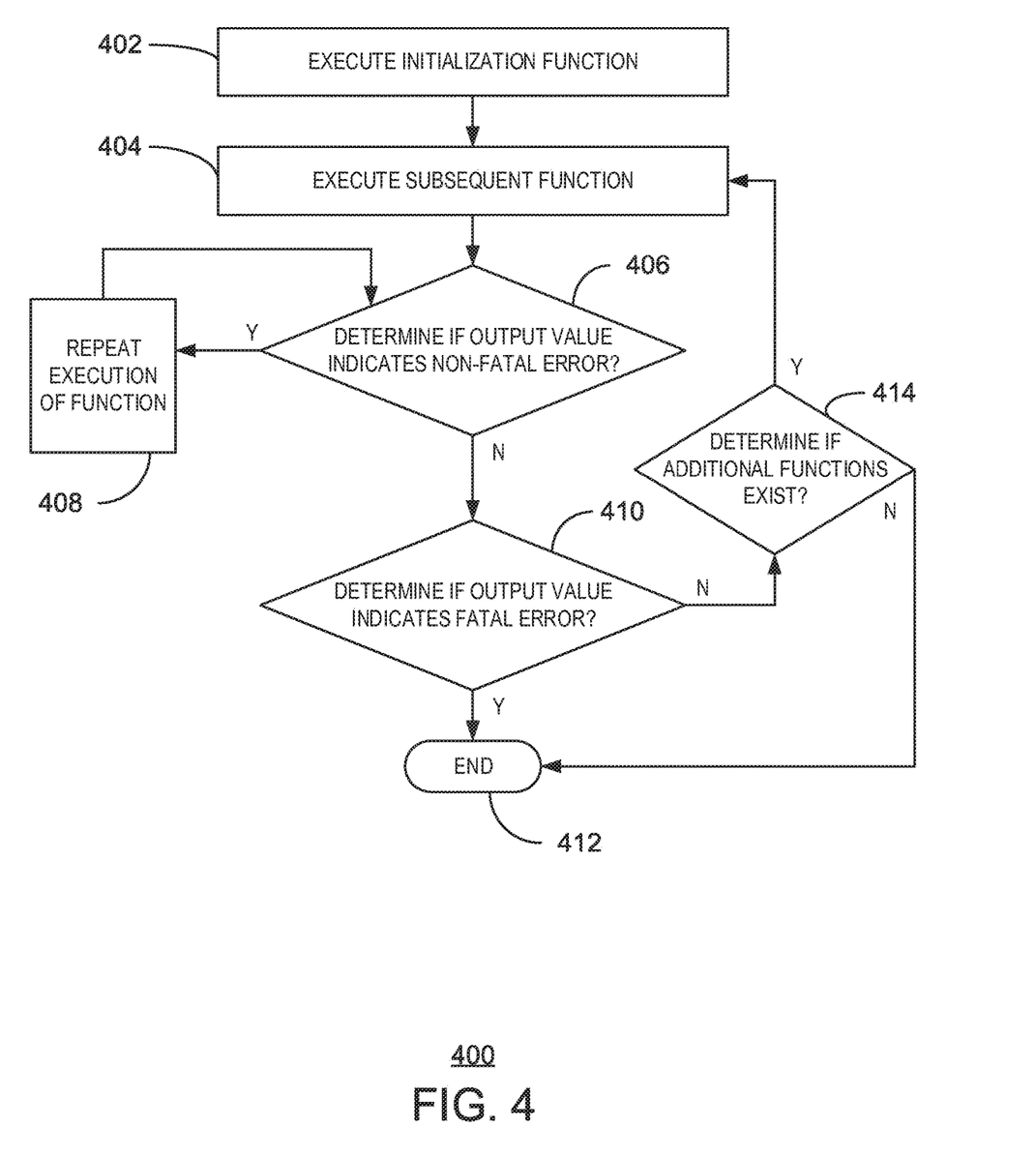
FIG. 4 is a process flow diagram of an example of executing an idempotent workflow.

FIG. 4 is a process flow diagram of an example of executing an idempotent workflow. The idempotent workflow 400 can include any amount of source code in any suitable programming language. In some embodiments, the idempotent workflow can be executed with any suitable computing device, such as computing device 100 of FIG. 1.

At block 402, a computing device can execute an initialization function. In some embodiments, the initialization function can load any suitable number of modules, detect a computing device identifier, and detect security information for the computing device, among others. In some embodiments, the state of a computing device during execution of the initialization function can be stored as an environment parameter. In some examples, the environment parameter can be stored along with the source code for each function in a. persistent workflow database. The computing device may also store a global identifier corresponding to the environment and a function in the persistent workflow database. In some examples, the environment can store the state of a computing device so that operations executed on a remote computing device may have the same state during each execution.

In some embodiments, the initialization function can also populate the persistent workflow database by detecting additional functions to be executed and storing the functions in the persistent workflow database. Additionally, the initialization function can also allocate storage for an input array and output array corresponding to each function to be executed. As discussed above, an input array may include a union of the output values of each previously executed function. In some embodiments, the output array may include a return value generated from executing a function.

At block 404, a computing device can execute a subsequent function. In some examples, the subsequent function may include a boundary function or an idempotent function. As discussed above, a boundary function may include establishing a new session with a remote computing device, or establishing a connection to a remote process, among others. In some embodiments, an idempotent function may include any suitable amount of source code that generates the same value for multiple executions of the idempotent function. In some embodiments, a flag may be stored that corresponds to each idempotent function. If the computing device detects that the flag is set to a particular value that indicates the idempotent function has not been executed, the computing device may execute the idempotent function. If the computing device detects that the flag is set to a particular value that indicates that the idempotent function has been executed, the computing device may retrieve the Output value from the idempotent function from the a previous execution, At block 406, the computing device can determine if the output value indicates a non-fatal error. A non-fatal error, as referred to herein, includes any error generated by a function that does not halt the execution of an idempotent workflow. For example, a non-fatal error may include an undefined parameter value, among others. In some embodiments, a computing device may repeat the execution of a function at block 408 when a non-fatal error is detected before returning to block 406. The computing device can continue at block 410 if the output value does not indicate a non-fatal error.

At block 410, the computing device can determine if the output value indicates a fatal error. A fatal error, as referred to herein, includes any error that halts the execution of the idempotent workflow. For example, a fatal error may include any suitable error related to an infinite loop, deadlock, or access violations, among others. If the computing device determines that an output value indicates a fatal error, the process flow ends at block 412. If the computing device determines that an output does not indicate a fatal error, the process flow continues at block 414.

At block 414, the computing device determines if additional functions exist. In some examples, the idempotent workflow may not include additional functions to execute. If the computing device determines that additional functions exist, the process flow returns to block 404 to execute the subsequent function. If the computing device determines that additional functions do not exist, the process flow ends at block 412.

The process flow diagram of FIG. 4 is not intended to indicate that the steps of the method 400 are to be executed in any particular order, or that all of the steps of the method 400 are to be included in every case. Further, any number of additional steps may be included within the method 400, depending on the specific application.

Figure 5:
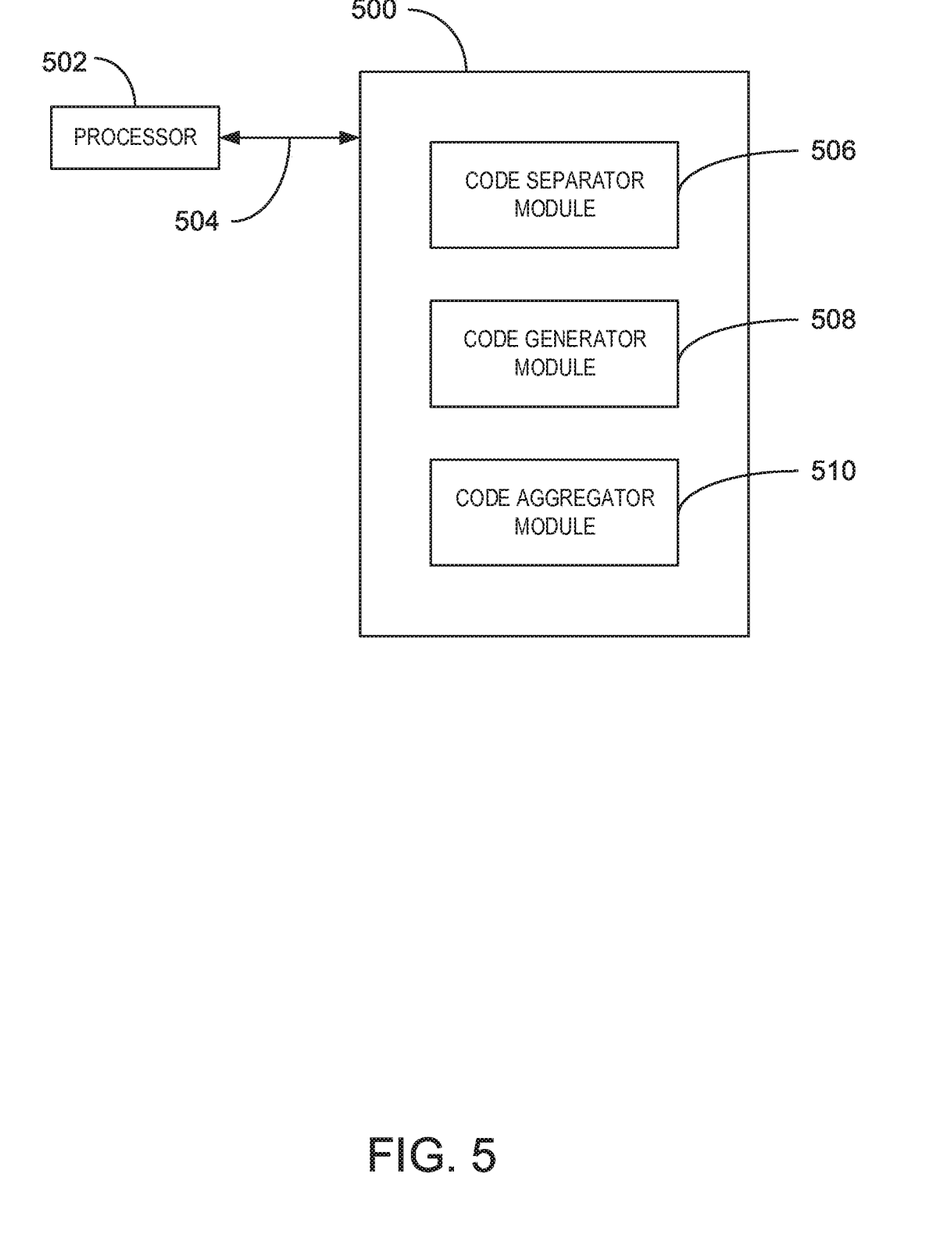
FIG. 5 is a block diagram showing a tangible, computer-readable storage media that can generate an idempotent workflow.

FIG. 5 is a block diagram showing a tangible, computer-readable storage media that can generate an idempotent workflow. The tangible, computer-readable storage media 500 may be accessed by a processor 502 over a computer bus 504. Furthermore, the tangible, computer-readable storage media 500 may include code to direct the processor 502 to perform the steps of the current method.

The various software components discussed herein may be stored on the tangible, computer-readable storage media 500, as indicated in FIG. 5. For example, the tangible computer-readable storage media 500 can include a code separator module 506, a code generator module 508, and a code aggregator module 510. In some embodiments, the code separator module 506 can separate distributed code into any suitable number and types of functions. For example, the code separator module 506 may separate distributed code into boundary functions and non-idempotent functions. In some embodiments, the code generator module 508 can generate any suitable number and types of functions. For example, the code generator module 508 may generate a transition function and a reversion function that can begin and end remote sessions. In some examples, the code generator module 508 can also convert or transform the non-idempotent functions into idempotent functions by adding new source code to the non-idempotent functions so that the non-idempotent functions are executed once. In some embodiments, the code aggregator module 510 can combine any suitable number of functions, such as the transition function, idempotent function, and reversion function, to form an idempotent workflow.

It is to be understood that any number of additional software components not shown in FIG. 5 may be included within the tangible, computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Figure 6:
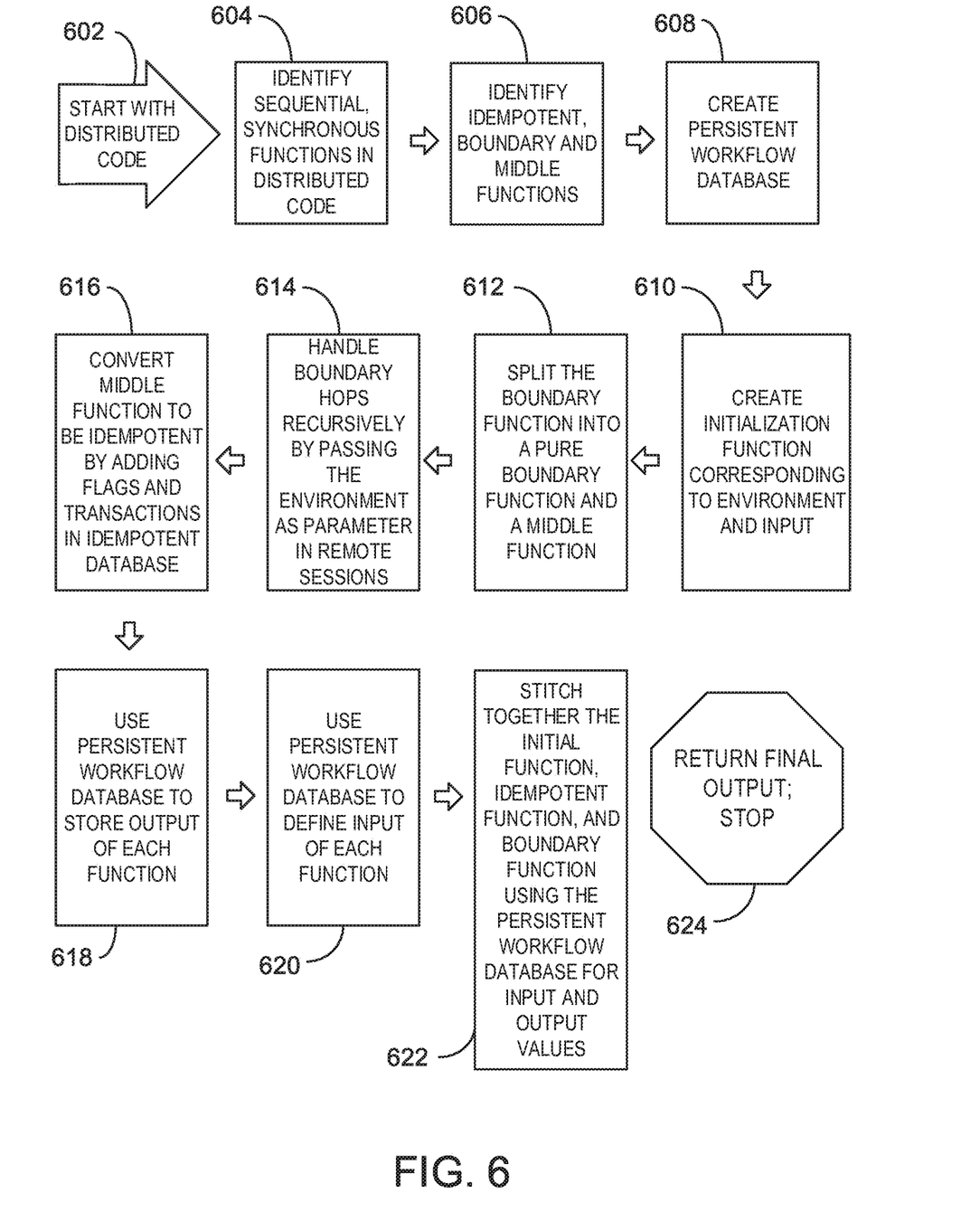
FIG. 6 is a process flow diagram of an example method for generating an idempotent workflow.

FIG. 6 is a process flow diagram of an example method for generating an idempotent workflow. The method 600 can be implemented with any suitable computing device, such as the computing device 100 of FIG. 1.

At block 602, the code separator module 120 can detect distributed code. As discussed above, distributed code can include any suitable source code that can be executed in a sequential and synchronous manner within any suitable number of computing devices. In some embodiments, distributed code can include various functions that may be executed on any suitable number of computing devices.

At block 604, the code separator module 120 can identify sequential, synchronous functions in the distributed code. In some embodiments, a sequential, synchronous function may be executed following a previously executed sequential, synchronous function. At block 606, the code separator module 120 can identify idempotent functions, boundary functions, and middle functions. As discussed above, idempotent functions can be restarted in the event of an error. The idempotent functions may also be executed any suitable number of times and return the same output value. In some examples, boundary functions can include any portion of distributed code that may include executing instructions in two separate computing devices, processes, or roles, among others. Middle functions, also referred to herein as non-idempotent functions, can modify the values of parameters during execution of operations. In some examples, the middle functions may modify the values of the parameters based on the state of a computing device.

At block 608, the code separator module 120 may create a persistent workflow database. In some embodiments, the persistent workflow database can store any suitable information pertaining to an idempotent workflow. For example, the persistent workflow database may store the functions included in an idempotent workflow, such as idempotent functions and boundary functions, among others. The persistent workflow database may also store data such as input values and output values for each function, and the last error that occurred during execution of a function, among others.

At block 610, the code generator 122 can create an initialization function corresponding to an environment and input. As discussed above, the initialization function can include any suitable input values and any suitable amount of source code to be executed. For example, the initialization function may establish the state or environment of a computing device in which additional functions are to be executed.

At block 612, the code generator 122 can split the boundary function into a pure boundary function and a middle function. The pure boundary function, also referred to herein as a transition function, can include any suitable source code that may transition from a local computing device, or process, among others, to a remote computing device, or process, among others. A middle function, also referred to herein as a non-idempotent function, can include any suitable amount of source code from the boundary function that modifies a parameter based on the state of a computing device.

At block 614, the code generator 122 can handle boundary hops recursively by passing the environment as a parameter in remote sessions. In some embodiments, the environment can represent the state of a computing device. In some examples, the code generator 122 can generate code that enables a transition function to receive a parameter corresponding to the environment of a local computing device or a remote computing device.

At block 616, the code generator 122 can convert the middle function to an idempotent function by adding flags and transactions (also referred to herein as functions) to an idempotent database. The flags can indicate whether a function has been previously executed. In some embodiments, a flag can indicate if a function is to be executed and return an output value or return an output value from a previous execution. For example, the flag may indicate that a function has not been executed. In some embodiments, the function may be executed and the output value can be stored in the idempotent database at block 618. If the function is executed again, the function may return the output value stored in the idempotent database from the previous execution of the function.

At block 620, the code generator 122 can use the persistent workflow database to define the input of each function. In some embodiments, each input value can include a union of the output values of each previously executed function. At block 622, the code aggregator 124 can stitch together the initial function, idempotent function, and boundary function using the persistent workflow database for input and output values. In some embodiments, the combination of the initial function, idempotent function, and boundary function can form the idempotent workflow. At block 624, the code aggregator 124 can return the final output after executing the idempotent workflow.

The process flow diagram of FIG. 6 is not intended to indicate that the steps of the method 600 are to be executed in any particular order, or that all of the steps of the method 600 are to be included in every case. Further, any number of additional steps may be included within the method 600, depending on the specific application.

What is claimed is:

1. A method, comprising:
   identifying a boundary function that executes at least a first portion of distributed code on a first computing device and at least a second portion of the distributed code on a second computing device different from the first computing device;
   separating the boundary function into a plurality of sub-functions based, at least in part, on operating characteristics corresponding to each of the plurality of sub-functions, wherein a first sub-function of the plurality of sub-functions generated from the boundary function has a first operating characteristic and a second sub-function of the plurality of sub-functions generated from the boundary function has a second operating characteristic different from the first operating characteristic;
   transforming the first sub-function of the plurality of sub-functions having the first operating characteristic to have the second operating characteristic different from the first operating characteristic to produce a single output value from multiple executions of the first sub-function of the plurality of sub-functions by storing a flag indicating whether the first sub-function of the plurality of sub-functions has been executed;

including code in the first sub-function of the plurality of sub-functions to enable the first sub-function of the plurality of sub-functions to execute only once; and combining the plurality of sub-functions to form a workflow having the second operating characteristic based, at least in part, on the flag.

2. The method of claim 1, wherein the first sub-function has a non-idempotent operating characteristic; and wherein the second sub-function has an idempotent operating characteristic.

3. The method of claim 2, wherein the plurality of sub-functions comprises a transition function that identifies a transition from the first computing device to the second computing device and a reversion function that terminates a session on the first computing device or the second computing device.

4. The method of claim 1, further comprising:

storing the plurality of sub-functions in a persistent workflow database.

5. The method of claim 4, further comprising:

storing an input array corresponding to the plurality of sub-functions in the persistent workflow database.

6. The method of claim 4, further comprising:

generating an error code based on generating an error during execution of any of the plurality of sub-functions; and storing the error code in the persistent workflow database.

7. The method of claim 4, further comprising:

calculating a number of instructions in any of the plurality of sub-functions; and storing the number of instructions in the persistent workflow database.

8. The method of claim 1, further comprising:

returning an output value from a previous execution of any of the plurality of sub-functions based, at least in part, on a second flag indicating that any of the plurality of sub-functions have previously executed.

9. One or more computer-readable storage media to generate a workflow comprising a plurality of instructions that, when executed by a processor, cause the processor to:

identify a boundary function that executes at least a first portion of distributed code on a first computing device and at least a second portion of the distributed code on a second computing device different from the first computing device;

separate the boundary function into a plurality of sub-functions based, at least in part, on operating characteristics corresponding to each of the plurality of sub-functions, wherein a first sub-function of the plurality of sub-functions generated from the boundary function has a first operating characteristic and a second sub-function of the plurality of sub-functions generated from the boundary function has a second operating characteristic different from the first operating characteristic, wherein the plurality of sub-functions comprises a transition function that identifies a transition from the first computing device to the second computing device and a reversion function that terminates a session;

transform the first sub-function of the plurality of sub-functions having the first operating characteristic to have the second operating characteristic different from the first operating characteristic to produce a single output value from multiple executions of the first sub-function of the plurality of sub-functions by storing a flag indicating whether the first sub-function of the plurality of sub-functions has been executed; and combine the plurality of sub-functions to form a workflow having the second operating characteristic based, at least in part, on the flag.

10. The one or more computer-readable storage media of claim 9, wherein the instructions cause the processor to include in the first sub-function of the plurality of sub-functions to enable the first sub-function of the plurality of sub-functions to execute only once.

11. The one or more computer-readable storage media of claim 9, wherein the instructions cause the processor to store the plurality of sub-functions in a persistent workflow database.

12. The one or more computer-readable storage media of claim 11, wherein the instructions cause the processor to store an input array corresponding to the plurality of sub-functions in the persistent workflow database.

13. The one or more computer-readable storage media of claim 11, wherein the instructions cause the processor to:

generate an error code based on generating an error during execution of any of the plurality of sub-functions; and store the error code in the persistent workflow database.

14. The one or more computer-readable storage media of claim 11, wherein the instructions cause the processor to:

return an output value from a previous execution of any of the plurality of sub-functions based, at least in part, on a second flag indicating that any of the plurality of sub-functions have previously executed.

15. A system for generating a workflow, comprising:

one or more storage devices to store executable code; and one or more processing devices to execute the executable code to:

identify a boundary function that executes at least a first portion of distributed code on a first computing device and at least a second portion of the distributed code on a second computing device different from the first computing device;

separate the boundary function into a plurality of sub-functions based, at least in part, on operating characteristics corresponding to each of the plurality of sub-functions, wherein a first sub-function of the plurality of sub-functions generated from the boundary function has a first operating characteristic and a second sub-function of the plurality of sub-functions generated from the boundary function has a second operating characteristic different from the first operating characteristic;

transform the first sub-function of the plurality of sub-functions having the first operating characteristic to have the second operating characteristic different from the first operating characteristic to produce a single output value from multiple executions of the first sub-function of the plurality of sub-functions by storing a flag indicating whether the first sub-function of the plurality of sub-functions has been executed;

include code in the first sub-function of the plurality of sub-functions to enable the first sub-function of the plurality of sub-functions to execute only once; and combine the plurality of sub-functions to form a workflow having the second operating characteristic based, at least in part, on the flag.

16. The system of claim 15, wherein the plurality of sub-functions comprises a transition function that identifies a transition from the first computing device to the second computing device and a reversion function that terminates a session.

17. The system of claim 15, wherein the one or more processing devices execute the executable code further to store the plurality of sub-functions in a persistent workflow database.

\* \* \* \* \*